United States Patent [19]

Lutz

[11] 3,712,124

[45] Jan. 23, 1973

[54] COMPACT ANALYZER FOR HAIR-LIKE FIBERS

[76] Inventor: George J. Lutz, 4721 North Washington Boulevard, Arlington, Va. 22205

[22] Filed: Oct. 1, 1971

[21] Appl. No.: 185,576

[52] U.S. Cl............................................73/95, 73/95
[51] Int. Cl................................................G01n 3/14
[58] Field of Search........................73/95, 141 A, 89

[56] References Cited

UNITED STATES PATENTS 2,496,053  1/1950  Hope..................................73/95
3,318,142  5/1967  Shoemaker........................73/95

Primary Examiner—Jerry W. Myracle
Attorney—Rose & Edell

[57] ABSTRACT

A device for testing the tensile strength and elongation capacity of hair and hair-like fibers includes an actuable rotator and a tension ring concentrically disposed and mounted for independent rotation. The tension ring is biased by a calibrated spring to a neutral angular position relative to a hand-held body member. Binding posts secured to the rotator and tension ring, respectively, secure respective ends of a hair being measured, whereby rotation of the rotator in opposition to the spring bias on the tension ring exerts a tension force on the tension ring through the measured hair. A scale member is rotatably mounted below the tension ring and actuator and includes a shoulder which is engaged by a projection from the tension ring, whereby the scale member rotates with the tension ring when the latter is rotated against the spring bias. The scale member includes an elongation scale, calibrated in percent elongation of the measured hair, which is read through an elongation indicator aperture defined through the rotator. The scale member additionally includes a breakage point scale, calibrated in tension force, which is read through a breakage point indicator aperture defined through the tension ring. Rotation of the actuable rotator relative to the tension ring is a measure of elongation of the hair and is measured on the elongation scale. The tension force which causes breakage of the hair is read on the breakage point scale through the breakage point indicator aperture after the tension ring is restored to its neutral position by the bias spring.

11 Claims, 9 Drawing Figures

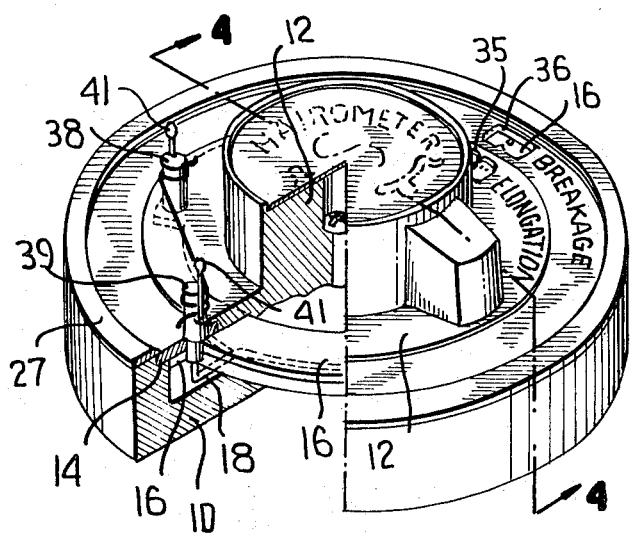
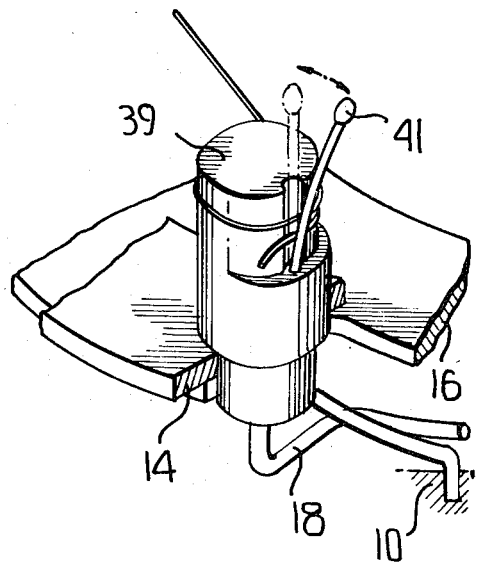
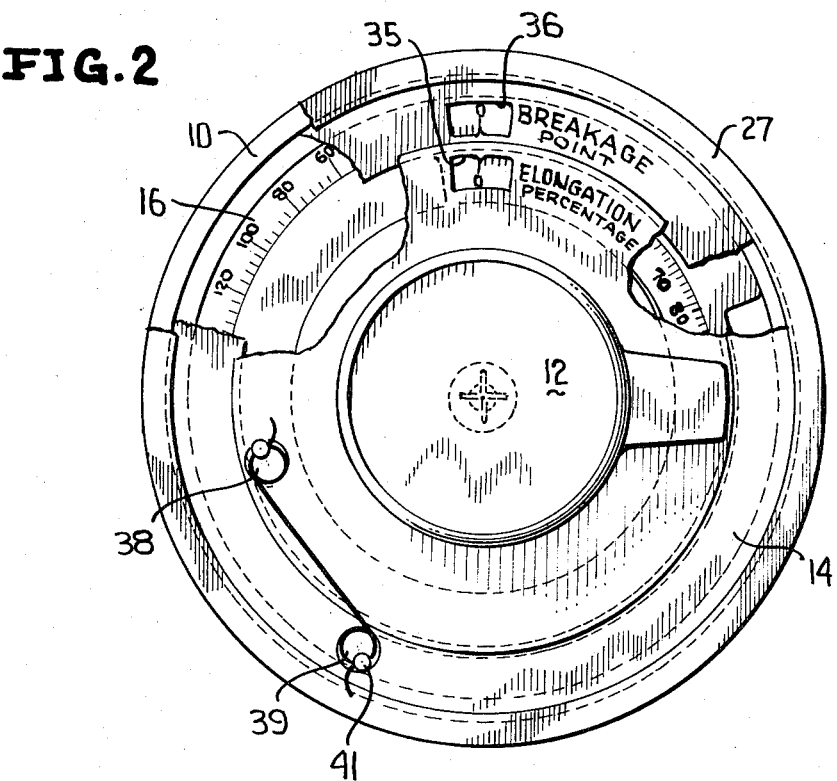

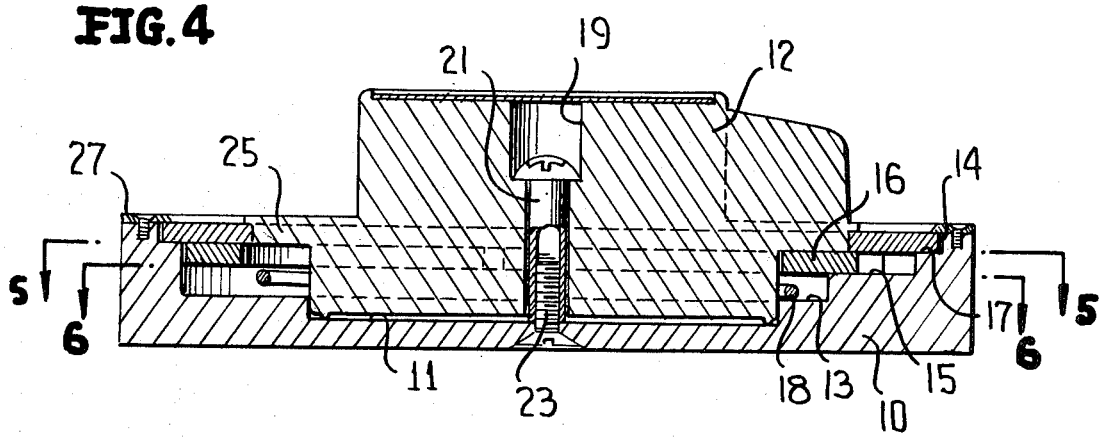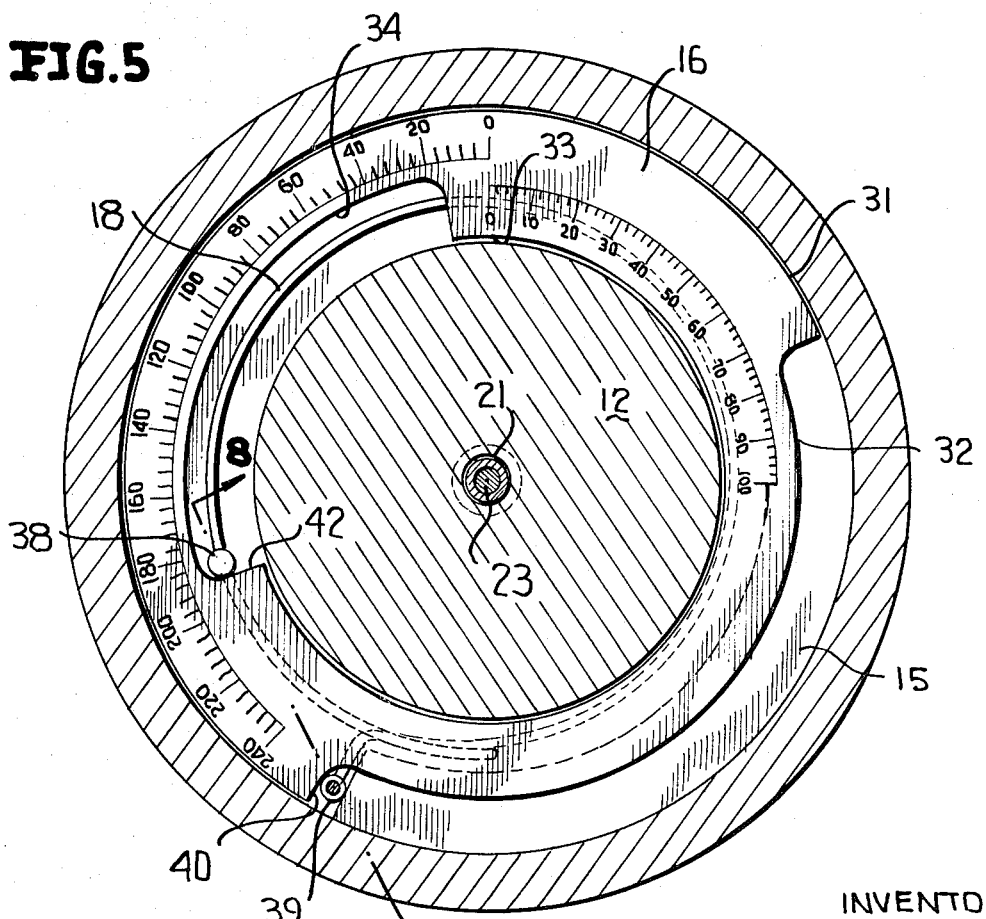

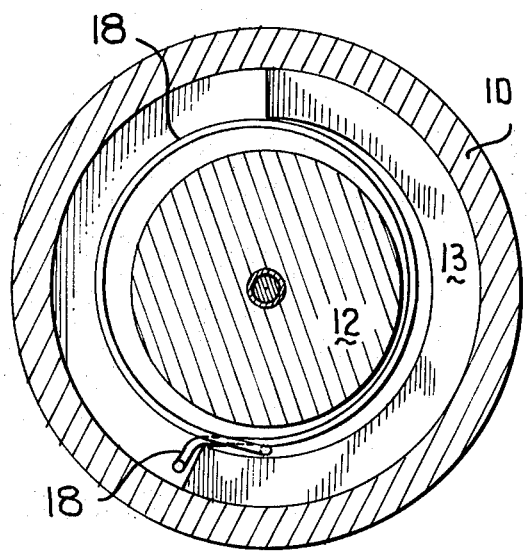
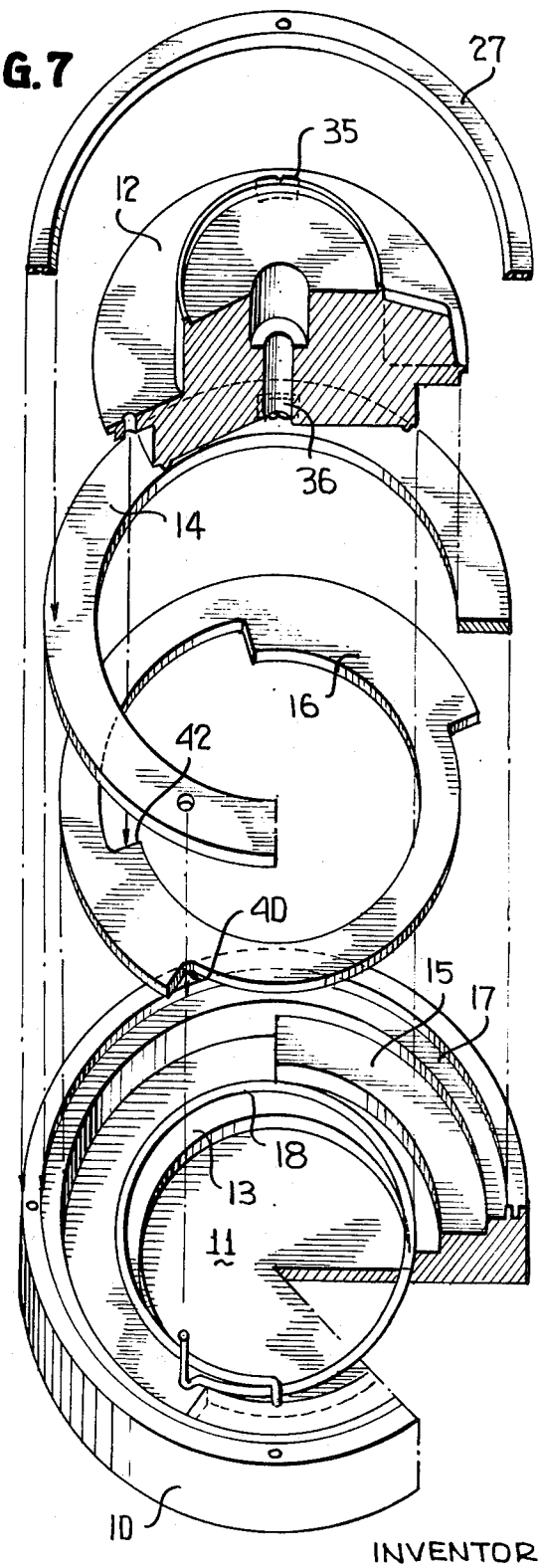
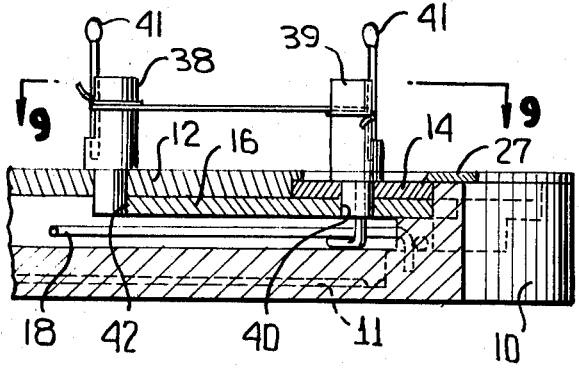
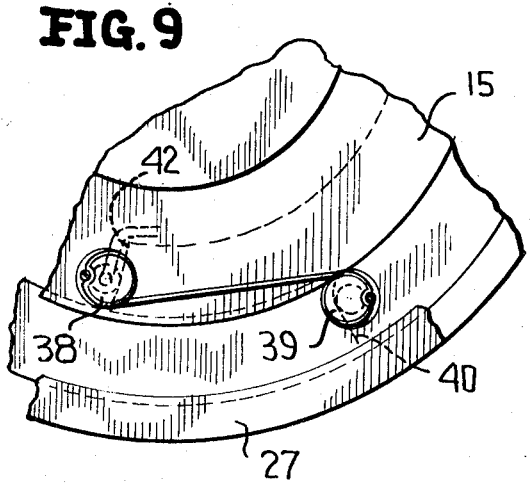

COMPACT ANALYZER FOR HAIR-LIKE FIBERS

BACKGROUND OF THE INVENTION

The present invention relates to measuring and testing hair and hair-like fibers, and more particularly relates to a compact, inexpensive, and easily manufactured device for measuring the tensile strength and elongation capacity of hair and hair-like fibers.

The description which follows deals primarily with the measurement of hair strength, although it is to be understood that the method and apparatus described herein are applicable to all proteinaceous fibers and to hair-like fibers in general. As applied to measuring hair strength, the present invention is concerned with establishing the protein and moisture content of hair through simple and accurate measurement of the breakage tensile force and the elongation capacity of the hair. The breakage tensile force is determined by the number of protein chains and cross-sectional area of the hair; elongation capacity is determined by the stretching ability of hydrogen bonds in the hair.

Accurate and inexpensive approaches to hair testing are required in a number of industries. For example, barbers and beauticians utilize harsh chemicals such as dyes, bleaches, shampoos, etc., which can have disasterous effects on weak hair when applied in heavy concentrations. If hair strength can be tested in a shop, cafe concentrations of these chemicals may be utilized. Moreover, proper hair treatment can be readily prescribed if hair strength deficiencies are detected.

Other industries in which knowledge of hair strength is important are wig-making, hair-weaving, etc. Moreover, individual consumers often wish to test their own hair so that they may take appropriate action to rectify a weak and brittle hair condition. Prior art hair strength testers have been too costly and/or too complex for widespread acceptance either in industry or by the private consumer.

It is therefore an object of the present invention to provide simple and inexpensive method and apparatus for testing hair strength.

It is another object of the present invention to provide a compact, easy-to-use apparatus for testing the tensile strength and elongation capacity of hair and hair-like fibers.

It is another object of the present invention to provide an apparatus for testing both the tensile strength and elongation of hair-like fibers with one simple operation.

SUMMARY OF THE INVENTION

The hair testing apparatus of the present invention comprises a body, three coaxially rotatable members, and a spring member. The three rotatable members include a tension ring, rotation of which is retarded by the spring member with a force proportional to the angular displacement of the tension ring relative to the body. The rotator is mounted in a concentric relationship with the tension ring and includes a binding post to which one end of the hair under test is secured. The binding post for the other end of the hair is mounted on the tension ring such that when no force is applied to the rotator the hair under test is oriented tangentially to the circular interface between the tension ring and rotator. Rotation of the rotator acts through the hair under test to apply a force to the tension ring against the action of the bias spring. Elongation of the hair under test is manifested by the angular displacement between the tension ring and the rotator. The tensile strength of the hair under test is determined by the angle through which the tension ring rotates in opposition to the calibrated bias spring before the hair under test breaks.

The scale member is mounted beneath the tension ring and rotator and includes shoulder which is engaged by a projection from the tension ring to thereby cause the scale member to rotate with the tension ring whenever the latter rotates in opposition to the bias spring. The scale member includes an elongation scale, calibrated in percent elongation, which is read through an elongation indicator aperture defined through the rotator. As the rotator is angularly displaced relative to the tension ring, the elongation indicator aperture experiences a similar angular displacement relative to the elongation scale.

The scale member additionally includes a breakage point scale which is viewed through a breakage point indicator aperture defined through the tension ring. Since the scale member rotates with the tension ring in opposition to the bias spring, the breakage point scale and the breakage point indicator aperture rotate together in a similar manner. When the hair under test breaks, the tension ring is no longer pulled by the rotator and therefore is snapped back to its neutral position by the bias spring. This action disengages the tension ring projection from the scale member shoulder so that the scale member remains in the position to which it was rotated at the instant of hair breakage. With the tension ring snapped back to its neutral position, the breakage point indicator aperture aligns with a reading on the breakage point scale which corresponds to the tensile force required to break the hair under test.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a partially cut away view in perspective of the hair tester of the present invention;

2 is a partially cut away top plan view of the apparatus of FIG. 1;

FIG. 3 is a detail drawing in perspective of a binding post utilized in the apparatus of FIG. 1;

FIG. 4 is a view in section taken along lines 4—4 of FIG. 1;

FIG. 5 is a view in section taken along lines 5—5 of FIG. 4;

FIG. 6 is a view in section taken along lines 6—6 of FIG. 4;

FIG. 7 is an exploded view of the components of the apparatus of FIG. 1;

FIG. 8 is a view in section taken along lines 8—8 of FIG. 5; and

FIG. 9 is a sectional view taken along lines 9—9 of FIG. 8.

DESCRIPTION OF PREFERRED EMBODIMENT

Referring to the accompanying drawings in greater detail, the preferred embodiment of the present invention is a hair tester comprising, in essence, a body portion 10, a rotator member 12, a tension ring 14, a scale ring 16 and a calibrated bias spring 18. Body portion 10 is generally circular and preferably small enough to be easily held in the palm of an operator's hand. Four concentric and generally circular recessed steps 11, 13, 15 and 17 are defined in the top surface of body 10. Recessed step 11, the deepest and diametrically smallest of the steps, is arranged to receive a lower cylindrical section of rotator 12 in sliding rotatable engagement. The upper portion of rotator 12 projects above body 10 and is adapted to be grasped by the operator and rotated within body 10. A central opening 19 through rotator 12 receives an internally threaded bolt 21 which in turn engages a screw 23 projecting upwardly through body 10 in recessed step 11. A shoulder in hole 19 engages the head of bolt 21 to prevent rotator 12 from slipping out of step 11.

Rotator 12 includes an intermediate portion in the shape of an annular flange 25 located inwardly of and in the plane of step 17. The latter, which is the shallowest and diametrically largest of the recessed steps in body 10, supports annular tension ring 14, the outside diameter of which is just slightly smaller than the outside diameter of step 17. The interior edge of tension ring 14 is positioned to circumferentially slide about flange 25, the latter including a lip which extends and slides over the interior edge of the tension ring. A retainer ring 27 (which is optional) secured to the rim of body 10 by screws or the like, projects over the outer circumferential edge of tension ring 14. The tension ring is thus held vertically in place between recess 17 at its bottom and retainer ring 27 and the lip of flange 25 at its top edges; however, tension ring 14 is free to rotate within its vertical confinement about rotator 12.

One step down from step 17 is recessed step 15 which does not form a complete circle but rather forms an arc of about 210°. The interior circumferential edge of tension ring 14 overhangs step 15 and rests slidably on scale ring 16 which is supported on step 15. More specifically, the scale ring outer edge 31 is just slightly smaller than the outside diameter of step 15. An arc-shaped recess 32 (approximately 120°) in edge 31 persists at a radius greater than the interior radius of step 15 so that scale ring 16 is always supported on step 15. The interior edge 33 of scale ring 16, which slidably abuts the lower cylindrical section of rotator 12, is also recessed at 34 (for approximately 95°) for reasons to be described in detail below. The scale ring is thus free to rotate in the plane of step 15 about rotator 12.

The top surface of scale ring 16 has two scales printed thereon. An elongation scale, calibrated from 0 to 100% elongation, extends clockwise about the scale ring for approximately 90° at a radial distance from screw 23 which corresponds to the radial displacement of an indicator aperture 35 defined through flange 25 in rotator 12. Aperture 35 serves as an elongation indicator aperture for the hair tester; it aligns with and permits the operator to view different portions of the elongation scale as rotator 12 is displaced angularly relative to scale ring 16.

The second scale of the top surface of scale ring 16 is the breakage point scale and is calibrated in force units (e.g. - grams). The breakage point scale extends counterclockwise along scale ring 16 at a radial distance from screw 23 which corresponds to the radial displacement of another indicator aperture 36 defined through tension ring 14. Aperture 36 serves as a breakage point indicator aperture for the hair tester. Aperture 36 is biased to align with the zero point of the breakage point scale by means of a bias spring, described below; it aligns with other portions of the breakage point scale whenever there is angular displacement between the tension and scale rings. Angular displacement between the tension ring 14 and the scale ring 16 occurs at breakage when the scale ring remains stationary and the tension ring is returned to its original position by the bias spring. This operation is described in detail subsequently. Importantly, the elongation scale and breakage point scale zero points are located at the same angular position but the scales extend in different angular directions.

Recessed step 13, disposed between steps 11 and 15 in body 10, provides an open area in which bias spring 18 is located. Spring 18 is a single (or multiple) coil rotary spring having one end extending downwardly and fixedly secured to the base of step 13. The other end of the spring extends upwardly and is secured to tension ring 14 in a manner described below.

A pair of binding posts 38, 39 are secured to the top surfaces of the rotator 12 and tension ring 14, respectively. Each binding post is generally cylindrical in configuration and includes a longitudinal slot into which a spring clip 41 is biased. Opposite ends of a hair to be tested are wrapped around the cylindrical portion of the binding post and then clamped into the longitudinal slot by spring clip 41.

The upwardly extending end of spring 18 is secured to the bottom of binding post 39. The latter is positioned to abut one end of step 15 when no rotational force is applied to the tension ring in opposition to the bias action of the spring. In addition, the bottom of binding post 39 is located at a radial displacement from screw 23 which is intermediate the radii of outer edge 31 and recessed edge 32 of scale ring 16. When tension ring 14 is rotated clockwise, as viewed in FIG. 5, the bottom of binding post 39 engages shoulder 40 between outer edge 31 and recessed edge 32 to also rotate the scale ring clockwise.

Likewise, the bottom portion of binding post 38 is displaced from screw 23 by more than the radius of inner edge 33 and less than the radius of recessed edge 34 of scale ring 16. Therefore, when rotator 12 is moved counterclockwise, as viewed in FIG. 5, binding post 38 engages a shoulder 42 between inner edge 33 and recessed edge 34 to also move the scale member counterclockwise.

Importantly, the bias spring acts to oppose clockwise rotation of tension ring 14 with a force proportional to the angular displacement of the ring. Angular displacement along the breakage point scale can thus be factory calibrated in units of force in accordance with the characteristics of spring 18. The elongation scale is calibrated in per cent elongation and is actually a measure of clockwise rotation of rotator 12 relative to tension ring 14. The spacing between elongation scale markings depends upon the positions and spacing between the binding posts 38, 39 before any force is applied to the rotator (typically 1 inch).

In operation, rotator 12 is first turned to its extreme counterclockwise position. In this position, binding post 38 urges scale ring 16 counterclockwise so that shoulder 41 abuts binding post 39. The latter in turn is at approximately zero tension and rests against step 15. Also in this position, aperture 35 is positioned over the zero marking on the elongation scale and aperture 36 is radially aligned with aperture 35 and positioned over the zero marking on the breakage point scale.

A hair is then tightly secured between the binding posts 38, 39 by wrapping each end around a respective post and clamping the wrapped ends with spring clips 41. The operator then rotates rotator 12 clockwise gradually, thereby applying a clockwise force to tension ring 14 through the hair under test. Clockwise rotation of the tension ring is opposed by spring 18 so that a tension force tends to stretch the hair under test. If the hair does not stretch, tension ring 14 moves clockwise with rotator 12 and, through the bottom portion of binding post 39, urges scale ring 16 clockwise. Since the rotator, tension ring and scale ring all move together, apertures 35 and 36 remain positioned over the zero markings on the elongation and breakage point scales, respectively.

If now the hair under test begins to stretch, rotator 12 experiences clockwise motion relative to both tension ring 14 and scale ring 16. Consequently, aperture 35 is displaced clockwise relative to the elongation scale and the percent elongation of the hair may be read on this scale. Aperture 36, however, remains aligned with the zero marking on the breakage point scale.

At some value of clockwise force applied to the rotator, the hair under test will break. This removes the clockwise force from tension ring 14 which is therefore snapped back counterclockwise by spring 18 to its neutral position in which binding post 39 abuts the end of step 15. Scale ring 16, however, is not snapped counterclockwise with the tension ring because binding post 39 dis-engages shoulder 40. Instead, scale ring 16 remains at the angular position it was in at the instant the hair was broken. This position, relative to the initial or neutral position of the scale ring, is a measure of the tension force applied to the hair at the instant of breakage. This force may be read directly from the breakage point scale through aperture 36 which was rotated counterclockwise when the tension ring snapped back to its neutral position.

The operation described above is a simple one step procedure which permits determination of both the tensile strength (breakage force) and elongation capacity of the hair under test. Measurement requires no complex preparation or technical knowledge on the part of the operator.

The breakage point reading obtained in any test is a measure of the tensile strength of the tested hair or fiber. This reading may be normalized with respect to hair cross-section by dividing the tensile strength by cross-sectional area of the tested hair. This division can be effected readily by means of a standard chart. The resulting normalized tensile strength varies in proportion to the amount of protein in the hair. A further chart may be provided to indicate the protein content of hair having a known normalized tensile strength, thereby indicating the type of protein treatment required.

The elongation scale is calibrated to read percentage increase in hair length from the original length between the binding posts. Calibration of this scale depends upon the geometry and dimensions of the unit. The elongation of a tested hair is a function of the moisture of the hair. A chart may be provided to indicate moisture directly for each elongation reading.

By utilizing the tensile strength versus protein relationship, the elongation versus moisture relationship, a table may be devised to directly indicate the condition of the tested hair from the two readings (breakage point and elongation). Such a table is listed below:

| Breakage Point (Grams) | | | | | |
|---|---|---|---|---|---|
| 200 | X | X | X | X | |
| 160 | X | ★ ★ ★ ★ ★ ★ | | | |
| | | ★ X | X ★ | | |
| 120 | X | ★ X | X ★ | X | |
| 80 | X | ★ X | X ★ | X | |
| | | ★ ★ ★ ★ ★ ★ | | | |
| 40 | X | X | X | X | |
| 0 | 20 | 40 | 60 | 80 | 100 |
| | Elongation (per cent) | | | | |

In the table, breakage point values are indicated in horizontal rows, elongation values are listed in vertical columns. The elongation and breakage point readings derived from a test can be located at a single point in the table. Reading points falling within the rectangle bordered by asterisks in the table are considered normal. Readings falling below the bottom line of the "normal" rectangle indicate that the tested hair is deficient in protein. Readings to the left of the "normal" rectangle indicate that the tested hair is too dry. Readings falling to the right of the "normal" rectangle indicate that the tested hair has excess moisture and that de-hydration is required. Readings falling above the "normal" rectangle indicate an excess of protein and that no protein treatment should be utilized.

The components of the hair tester described above are easily manufactured and assembled and therefore inexpensively produced. The components may, for example, be made from high impact plastic material in a simple injection-molding process. Fabrication of the components from suitable metal is also contemplated.

To optimize application of tension force to the hair, it is preferable that the neutral position (i.e. - no applied force) of the binding posts be such that the hair under test is tangentially oriented relative to rotator 12 at binding post 38. It is to be stressed that this orientation of the hair is preferable, but not necessary. Calibration of the elongation scale, of course, will vary as the neutral orientation of the hair is varied, but it is a simple matter to relate linear displacement between the binding posts to angular displacement between the rotator and tension ring.

Numerous variations of the preferred configuration are possible within the scope of this invention, particularly as regards the specific positioning of the rotator, the biased tension ring, and scale ring. Importantly, these three components interacting according to the principles described herein, comprise a novel testing apparatus for hair and hair-like fibers, the apparatus being simpler and less expensive than prior art devices intended for similar tests. Of course, it will be understood that rotary motion of these components, while utilized in the preferred embodiment, is not a limiting factor. For example, relative linear motion of the three components is possible, although the resulting unit would be larger than the rotational embodiment. In the linear unit, the "rotator" would be a "slider" and would carry one binding post. The "tension ring" would be a slidable elongated member carrying the other binding post and would be at least partially disposed alongside sliding scale engaged by the elongated tension member moving in one direction and by the "slider" moving in the other direction. Of course the elongated tension member would be biased by a spring, or the like, to a neutral position.

While I have described and illustrated one specific embodiment of my invention, it will be clear that variations of the details of construction which are specifically illustrated and described may be resorted to without departing from the true spirit and scope of the invention as defined in the appended claims.

I claim:

1. A device for measuring the tensile strength of a hair or hair-like fiber comprising:
   a body;
   a control member mounted on said body for operator-initiated motion relative to said body along a first predetermined path;
   a further member movably mounted on said body, said further member being movable along a second path of the same general configuration and directions as said first predetermined path;
   first and second binding posts mounted on said control member and further member, respectively, and arranged to support a hair under test in tension between binding posts;
   a scale member mounted on said body for movement along a third path of the same general configuration and direction as said first predetermined path;
   wherein a portion of said further member is arranged to engage a portion of said scale member only when said further member is moved along at least a portion of said second path in a first direction, thereby moving said scale member along said third path in said first direction whenever said further member is moved along said portion of said second path in said first direction;
   bias means for positionally biasing said further member to a neutral position in said second path and opposing motion of said further member in said first direction with a force which is a function of the displacement of said further member from said neutral position in said first direction;
   wherein said scale member includes a breakage point scale calibrated as a measure of the force required to move said further member in said first direction along said second path in opposition to said bias means, said breakage point scale extending along a fourth path configured substantially the same as said portion of said second path; and
   a first indicator secured to and movable with said further member for alignment with different portions of said breakage point scale in response to relative movement between said scale member and said further member, said indicator being aligned with a portion of said breakage point scale corresponding to zero force when said portions of said further member and scale member are engaged.

2. The device according to claim 1 wherein said scale member includes an elongation scale calibrated in as a measure of the displacement between said first and second binding posts, said elongation scale extending along a path configured substantially the same as at least a portion of said first path, and wherein a second indicator is provided and secured to said control member for movement therewith in alignment with different portions of said elongation scale in response to movement of said control member in said first direction relative to said scale member.

3. The combination according to claim 2 wherein, upon securing a hair between said binding posts and moving said control member in said first direction, said further member is moved by a force applied from the control member through the hair under test, whereby stretching of said hair under test results in displacement of said second indicator relative to said elongation scale, and whereby, upon breakage of said hair under test, said further member is snapped back in said second direction to said neutral position by said bias means, causing said portions of said further member and scale member to disengage and displace said first indicator relative to said breakage point scale to a degree determined by the displacement of said further member from said neutral position at the instant of breakage of said hair under test.

4. The combination according to claim 3 wherein said control member includes an element arranged to engage an element of said scale member when said control member is moved in said second direction, whereby movement of said control member in said second direction causes like movement of said scale member until said control member reaches an extreme position at which said portions of said further member and scale member are engaged at said neutral position of said further member.

5. The combination according to claim 4 wherein said bias means is a spring secured between said body and said further member.

6. The combination according to claim 4 wherein said scale member is disposed below said control member and said further member, and wherein said first and second indicator are apertures defined through said further member and control member, respectively, to permit viewing of said breakage point and elongation scales, respectively.

7. The combination according to claim 4 wherein said control member, said further member, and said scale member are mounted for rotation relative to said body and about a common axis, said first, second and third paths being rotational.

8. The combination according to claim 7 wherein said control member and said further member include co-planar concentrically disposed portions, wherein said first and second indicators are positioned to be angularly aligned when said further member is in said neutral position and said control member is in said extreme position, and wherein said breakage point scale and said elongation scale have angularly aligned zero points and extend in opposite angular directions, said zero points being disposed on said scale member to align with said indicators when said indicators are angularly aligned.

9. The combination according to claim 8 wherein said scale member is disposed beneath said control and further members, and wherein said first and second indicators are apertures defined through said further member and control member, respectively, above said breakage point and elongation scales, respectively.

10. A device for measuring the elongation capacity of a hair or hair-like fiber comprising:
a body;
a control member mounted on said body for operator-initiated motion relative to said body along a first predetermined path;
a further member movably mounted on said body, said further member being movable along a second path of the same general configuration and directions as said first predetermined path;
first and second binding posts mounted on said control member and further member, respectively, and arranged to support a hair under test in tension between binding posts;
a scale member mounted on said body including a scale calibrated as a measure of the displacement between said control member and said further member;
wherein a portion of said further member is arranged to engage a portion of said scale member only when said further member is moved along at least a portion of said second path in a first direction, thereby moving said scale member along said third path in said first direction whenever said further member is moved along said portion of said second path in said first direction;
bias means for positionally biasing said further member to a neutral position in said second path and opposing motion of said further member in said first direction with a force which is a function of the displacement of said further member from said neutral position in said first direction;
an indicator secured to and movable with said control member for alignment with different portions of said scale in response to relative movement between said scale member and said control member, said indicator being aligned with a portion of said scale corresponding to zero force when said portions of said further member and scale member are engaged.

11. The combination according to claim 4 wherein said control member, said further member, and said scale member are mounted for rotation relative to said body and about a common axis, said first, second and third paths being rotational.

* * * * *